United States Patent [19]

Morganti et al.

[11] 4,384,343

[45] May 17, 1983

[54] FIRMWARE CONTROLLED SEARCH AND VERIFY APPARATUS AND METHOD FOR A DATA PROCESSING SYSTEM

[75] Inventors: Victor M. Morganti, Lincoln; Virendra S. Negi, Pepperell; Michael J. D. Graesser, Acton, all of Mass.

[73] Assignee: Honeywell Information Systems Inc., Waltham, Mass.

[21] Appl. No.: 308,782

[22] Filed: Oct. 5, 1981

Related U.S. Application Data

[63] Continuation of Ser. No. 11,597, Feb. 12, 1979, abandoned.

[51] Int. Cl.³ .............................................. G06F 7/04
[52] U.S. Cl. .................................................. 364/900
[58] Field of Search ... 364/200 MS File, 900 MS File; 365/49, 50

[56] References Cited

U.S. PATENT DOCUMENTS

| | | | |
|---|---|---|---|
| Re. 26,919 | 6/1970 | Hagelbarger et al. | 364/900 |
| 3,402,394 | 9/1968 | Koerner et al. | 365/49 |
| 4,145,753 | 3/1979 | Kashio | 364/900 |
| 4,149,262 | 4/1979 | Lamb et al. | 364/900 |
| 4,163,288 | 7/1979 | Vinot | 364/900 |

Primary Examiner—Harvey E. Springborn
Attorney, Agent, or Firm—John S. Solakian; Nicholas Prasinos

[57] ABSTRACT

An alphanumeric search apparatus wherein a plurality of search indicia stored in a first operand and a plurality of elements stored in a second operand are operated upon by a data processing system to determine by means of search or verify operations whether any of the elements included in the second operand correspond to any one of the indicia included in the first operand. The second operand may be arranged in a sequential string of elements or in an array or table of elements and a search is conducted by comparing each element sequentially with all the search indicia and by so processing the elements until a match is found. A verify procedure is conducted by comparing each element with the search indicia to verify that there is a counterpart for each search element in the list of search indicia. For a search procedure, an output is generated indicating the storage locations within their respective operands of the search indicia and the element which produced the match. For a verify procedure an output is generated indicating the first storage location of a search element that is not included in the list of search indicia.

14 Claims, 11 Drawing Figures

FIRMWARE CONTROLLED SEARCH AND VERIFY APPARATUS AND METHOD FOR A DATA PROCESSING SYSTEM

This is a continuation of application Ser. No. 11,597, filed Feb. 12, 1979, which is now abandoned.

RELATED APPLICATIONS

The following applications except for the summaries of the invention, objects of the invention, and claims thereof are incorporated by reference to the instant application.

1. "Binary Coded Decimal Correction Apparatus" invented by Virendra S. Negi and Arthur Peters, filed on Jan. 3, 1979 and having Ser. No. 000,735 and assigned to the same assignee named herein. This application issued as U.S. Pat. No. 4,245,328 on Jan. 13, 1981.

2. "Control File Apparatus for a Data Processing System" invented by Virendra S. Negi and Arthur Peters, filed on Jan. 3, 1979 and having Ser. No. 000,733 and assigned to the same assignee named herein. This application issued as U.S. Pat. No. 4,258,420 on Mar. 24, 1981.

3. "Arithmetic Logic Apparatus for a Data Processing System" invented by Virendra S. Negi and Arthur Peters, filed on Jan. 3, 1979 and having Ser. No. 000,842 and assigned to the same assignee named herein. This application issued as U.S. Pat. No. 4,272,828 on June 9, 1981.

4. "Control Store Address Generation Logic for a Data Processing System" invented by Arthur Peters and Virendra S. Negi, filed on Jan. 3, 1979 and having Ser. No. 000,864 and assigned to the same assignee named herein. This application issued as U.S. Pat. No. 4,224,668 on Sept. 23, 1980.

BACKGROUND OF THE INVENTION

In a data processing system there is a frequent need to manipulate information and, while manipulating information, there is a frequent need to search an operand to determine whether it contains one set of predetermined characters or sequences of characters. Such characters could, for example, be blanks (spaces), punctuation marks, decimal digits, etc., or, for example, could be a predetermined name or names in a list of names. Similarly, there is sometimes a need to verify whether the operand, which may include a list of items, contains such predetermined items, such items, for example, being similar to those in the case for searching. In the prior art, such operations have been handled by software subroutines consisting of multiple software instructions such as alphanumeric compares, branches, etc., which subroutines ordinarily take a longer period of time to execute. It is desirable to minimize the time required to perform such search and verify operations particularly due to the frequent use thereof in a data processing system. Further, such prior art systems have been limited in the number of items or indicia which can be searched for or verified with elements in a string or array (or table) of elements.

It is accordingly a primary object of the invention to provide an improved alphanumeric search technique for use in a data processing system.

SUMMARY OF THE INVENTION

The objects of the present invention are achieved in a search procedure by providing apparatus for providing a first operand which includes at least two search indicia, and apparatus for providing a second operand which includes a plurality of elements to be searched. Also provided is apparatus for determining whether the elements in the second operand correspond to any one of the indicia in the first operand. In response to such apparatus for determining, apparatus is provided for generating a result, which result is representative of the first one of the search indicia which is found equal to one of the elements in such plurality of elements in the second operand. Apparatus is also provided for enabling each of such elements to be compared against each of such indicia on a sequential basis until each of such elements are so compared. The apparatus is disabled when there is an equal comparison of one of the elements with one of the search indicia.

In the verify procedure mode, the apparatus of the present invention provides a first operand having at least two verify indicia and a second operand having a plurality of elements to be verified. Further apparatus is provided for determining whether all of the elements in the second operand correspond to one of the verify indicia included in the first operand. Apparatus is also provided which is responsive to an indication that one of such elements does not correspond to any of such verify indicia for producing a result. Such result will be negative if, in fact, any one of the elements included in the second operand is not found in one of the verify indicia included in the first operand. A positive result will be indicated if all of the elements included in the second operand are included in any one of the indicia in the first operand. Apparatus is further provided for sequencing through each of such elements in comparing such elements against such indicia until one of such elements is found not to compare with any of the verify indicia included in the first operand.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT

Figure 1:
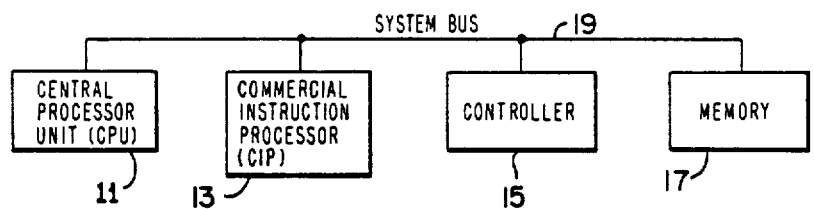
FIG. 1 illustrates the overall system configuration which incorporates the present invention.

Referring to FIG. 1, a commercial instruction processor (CIP) 13 is provided to expand the instruction set capabilities of CPU 11 by using a powerful set of commercial type instructions. These instruction types allow the CPU, via the CIP, to process decimal and alphanumeric data; the instruction types are listed as follows: Decimal, Alphanumeric, Data Conversion and Editing. CIP communication with the CPU and main memory 17 is conducted via a common system bus 19 under control of bus controller 15. The CIP operates as an attachment to the CPU and receives instructions and operands as transfers from the CPU and/or memory. The CIP executes the commercial instructions as they are sent over the bus 19 by the CPU 11. The CPU obtains these instructions from main memory, examining each fetched instruction specifically for a commercial instruction. Receipt of each commercial instruction by the CIP is usually concurrent with the CPU, as the CPU extracts and decodes each instruction from memory. However, CIP instruction execution is asynchronous with CPU operations. Any attempt to execute a commercial instruction when a CIP is not installed in the system causes the CPU to enter a specific trap condition.

The CIP receives information from the CPU and main memory via the bus 19, and processes this information in a logical sequence. This sequence consists of four CIP operational states as follows: idle state, load state, busy state and trap state.

Figure 2:
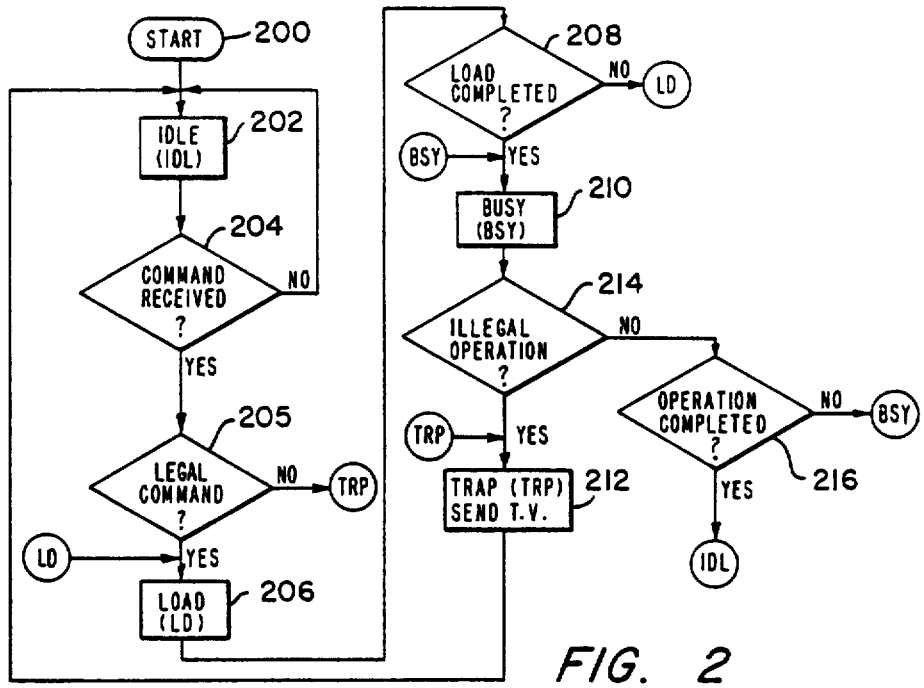
FIG. 2 is an operational sequence state diagram of the process or utilized to implement the present invention.

As shown in FIG. 2, the CIP enters block 200 and remains in the idle state (block 202) when not processing information, and must be in the idle state to accept a command (i.e., a CIP instruction or an I/O command) from the CPU. On receipt of a command (block 204), if legal (block 205), the CIP enters the load state (block 206) and remains in the load state until all associated command information is received. When this information is successfully received (block 208), the CIP enters the busy state (block 210) to process the information. Any further attempts by the CPU to communicate with the CIP while in its busy state are not acknowledged by the CIP until it returns to the idle state again. CIP processing includes the communication activity with main memory that occurs when fetching the necessary operand(s). The CIP enters the trap state (block 212) only when specific illegal events occur (block 214), such as detection of an illegal operand length or an out of sequence command. Return is made to the idle state if the operation has been completed (block 216).

All pertinent instruction transfers to the CIP are performed jointly by the CPU and CIP. They are decoded and sent by the CPU to the CIP along with all of the pertinent information required for execution of the instruction. When the transfer of the information is completed, the CPU and CIP continue to process their respective instructions. Each CIP instruction contains a 16-bit wide instruction word that is immediately followed with up to six additional descriptive type words (also 16-bits wide), called data descriptors and labels. The instruction word contains the CIP op-code that is sent to the CIP for processing. The data descriptors describe the operand type, size, and location in memory; the label provides the address of a remote data descriptor. Both the data descriptor and the label are processed by the CPU; related information derived by this action, such as an operand type and memory address, is sent to the CIP for processing. The CPU accomplishes the preceding by analyzing the op-code that is contained in each instruction. When the CPU detects a CIP instruction (i.e., if the CIP is in the idle state), the CPU sends the instruction op-code and the related information in the following manner: (i) the CPU sends the op-code (i.e., the first word of the commercial instruction) to the CIP and the CIP enters the load state when it accepts the op-code; (ii) the CPU fetches the first data descriptor and interrogates the address syllable to generate the effective address; (iii) The CPU sends the following information: the 24-bit effective byte address of the first operand, the contents of the pertinent CPU data register, if applicable, and the data descriptor of the first operand, updated to reflect a byte (eight bits) or half-byte (four bits) digit position within a word. As second and third operands are encountered, the CPU performs the applicable procedures in steps ii and iii.

At this point, the CIP is loaded with all of the necessary information required to execute the commercial instruction and enters the busy state to execute the instruction. When necessary, the CIP communicates directly with main memory to obtain the applicable operand(s). However, it should be noted that the CIP never directly accesses any CPU registers. It only uses information sent to it by the CPU. Hence, no CPU registers are modified by the CIP and the CPU continues to process the next and each succeeding CPU instruction until one of the following conditions occurrs: (i) the CIP, via a trap vector (TV), notifies the CPU that an illegal event occurred during the execution of the current commercial instruction; or (ii) an internal or external interrupt signal is detected by the CPU.

When an interrupt signal is detected by the CPU, the CPU responds in the following manner. The CPU determines whether or not the last commercial instruction was completed by the CIP. The CPU waits for completion of the last commercial instruction. When the last commercial instruction is completed, the CPU determines if it resulted in a trap request. If it did, the CPU honors the trap request before performing the interrupt. This results in a typical context save/restore operation to store all relevant CPU and CIP status information, as required. With the completion of the CPU operations required to process a CIP trap request, or when there is no trap request and a CIP instruction is available for processing, the CPU performs the following. The CPU updates its program counter to point to the commercial instruction it was attempting to initiate. The CPU defers the attempt to process the commercial instruction until the current interrupt is serviced. The CPU honors and services the interrupt caused by the external device.

As the CIP executes an instruction, all CPU registers, including those referenced by the current commercial instruction, can be altered by a program via CPU instructions. However, the software must not modify the operand for a commercial instruction until the CIP is through processing that instruction; otherwise, unspecified results will occur. Branch instructions included in the CIP instruction repertoire are executed synchronously by the CPU and the CIP.

The three types of data that make up the data words processed by the CIP are Alphanumeric Data, Binary Data and Decimal Data. Each data type is classified into units of binary information. By definition this unit, when used to reference alphanumeric and binary data characters equals eight bits (one byte); when used to reference decimal data characters, it equals four bits (half byte) for packed decimal data and eight bits (one byte) for string decimal data. Also, single precision binary numbers consist of two units (two bytes) and double precision binary numbers consist of four units (four bytes).

Figure 3:
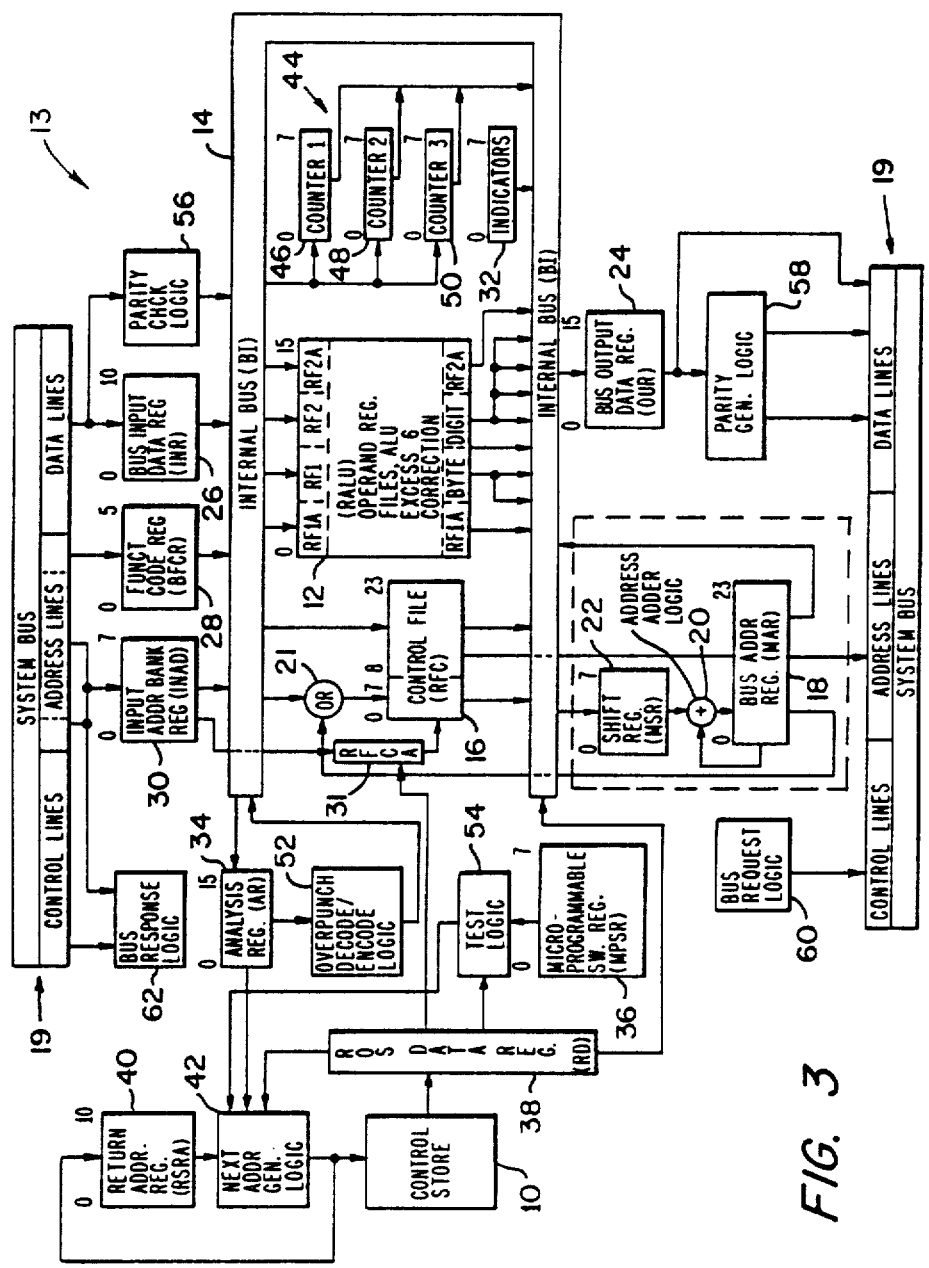
FIG. 3 is a block diagram of the commercial instruction processor utilized with the present invention.

FIG. 3 is a major block diagram of the commercial instruction processor 13 of the present invention, showing all of the major data transfer paths between the processor's registers.

The control store 10 is comprised of a plurality of locations, one for each control store or firmware word. These firmware words directly or indirectly control the processor sequences, data transfer paths, and bus operations.

The operand register files and arithmetic logic unit (RALU) 12 primarily includes two register files, an arithmetic logic unit (ALU) and the associated multiplexers and control registers. Included in the RALU 12 are the operand register files (RF1 and RF2), each containing sixteen sixteen bit locations that are used to buffer operands for execution in the ALU. The ALU input multiplexers and latches are comprised of the following: three 2-to-1 multiplexers (zone selection), two 4-to-1 multiplexers (digit selection), and two 8-bit latches (byte latches). These multiplexers and latches are used to deliver data from the operand register files to the ALU. Data can also be transferred from a current product counter to the ALU or from operand register file 2 to a multiply register. The 8-bit ALU (which is comprised of two 4-bit ALU chips, a carry look-ahead chip, and a carry in/carry out flip-flop) is capable of performing the following operations on operands presented at its two inputs: Binary Add, Binary Subtract Input 1 from Input 2, Binary Subtract Input 2 from Input 1, Logical OR, Logical AND, Exclusive OR, Set ALU Output Equal to FF, and Clear ALU Output to 00. The RALU is discussed in detail with respect to FIG. 5.

The excess 6 (XS6) correction logic of the RALU is enabled whenever the ALU is in decimal mode, and is used to change the binary output from the adder to the correct decimal digit while modifying the carry output for subsequent operations. XS6 correction is accomplished by using a 32-bit by 8-bit PROM chip, which encodes the corrected three high-order bits of the digit and generates the corrected carry. A digit less than two function is also available on the output of the PROM chip for other controls. The ALU output multiplexer is used to feed either the upper four bits of the adder output or the correct decimal zone bits to the internal bus 14, depending on whether the ALU is operating in binary or decimal mode, respectively. The RALU control logic consists of three registers, which are as follows: RF1A—Register File 1 Address Register, RF2A—Register File 2 Address Register and ALMR—ALU Mode Control Register. These registers, in conjunction with several microinstructions, control all operations within the RALU. Besides the registers and control described previously, there are two other registers that are classified as RALU registers. These registers are the current product counter (CPRC) and the multiplier register (MIER), to be discussed hereinafter.

Still referring to FIG. 3, the control file 16, also referred to as register file C (RFC), is a 16 location by 24 bit random access memory (RAM) that is primarily used to store all instruction related information that originates from the CPU 11 (e.g., task words, data descriptors, effective addresses, etc.). The control file also contains several work locations which are used by the processor (CIP) firmware. The control file 16 receives bits 0–7 from either internal bus 14 or bus address register (MAR) 18 via OR logic multiplexer 21. The bus address register (MAR) 18 and address adder logic 20 shall now be discussed. The MAR register 18 is a 24-bit address register that is primarily used to address the system bus 19. It is comprised of an 8-bit, two-input multiplexer register on the low end and a 16-bit incrementor/decrementor on the high end. The multiplexed input into the lower eight bits is from either the control file 16 or the output of the address adder 20. The address adder 20 is an 8-bit two's complement adder unit that is primarily used for incrementing or decrementing the contents of the bus address register 18. The inputs to the address adder 20 are the low-order eight bits of the bus address register and the 8-bit shift register (MSR) 22. The shift register (MSR) 22 is an 8-bit universal shift register that can be loaded from the internal bus 14 and is capable of shifting left or right by one bit (i.e., open-end shift with zero-fill). The shift register functions as an input to the address adder 20 for incrementing or decrementing the bus address register 18. In addition, bit 0 of the shift register 22 can be loaded into the ALU carry-in flip-flop, which is useful during execution of the conversion instructions.

The bus output data register (OUR) 24 is a 16-bit data register that is used to transfer data onto the bus 19 data lines. It is loaded from the internal bus 14 with either the lower or upper byte or the entire 16-bit word. The bus input data register (INR) 26 is a 16-bit data register that is used to receive data from the bus 19 data lines. The contents of the input data register can be unloaded onto the internal bus 14.

The input function code register (BFCR) 28 is a 6-bit register that is used to store the function code when the CIP accepts any bus 19 input or output command. Subsequently, firmware examines the contents of the function code register 28 and executes the specified command. The input address bank register (INAD) 30 is an 8-bit register that is used to store the high-order eight memory address bits that are received over the bus 19 address lines. The high-order eight address bits contain the memory module address and are transmitted by the CPU 11 as the result of a so-called IOLD command or an output effective address function code. The low-order 16-bits of the memory address are received over the bus 19 data lines and are strobed into the INR register 26, forming the required 24-bit main memory address.

Figure 4:
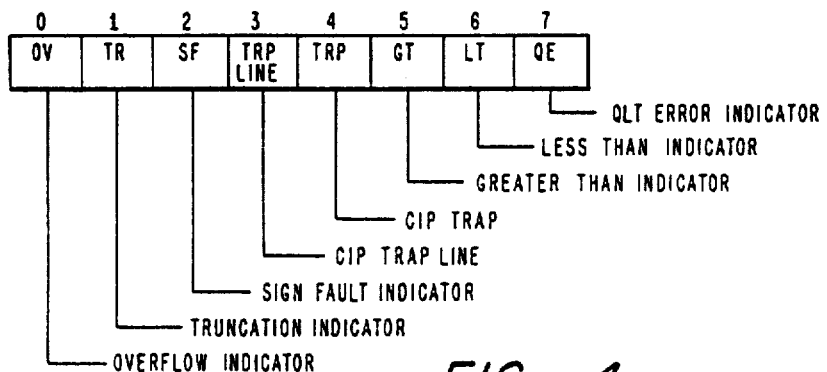
FIG. 4 illustrates the contents of one of the registers of the processor aforementioned commercial instruction.

The CIP indicator register 32 is an 8-bit storage register in which each bit can be individually set or reset. The indicator register bit configuration is shown in FIG. 4. The TRP and TRP LINE indicators are used by the CIP 13 for internal processing only and are not software visible. The TRP LINE (CIP trap line) indicator is used to inform the CPU 11 of an existing CIP trap condition and is transmitted over the bus 19 via the external trap signal. When set, the TRP (CIP trap) indicator allows the CIP to accept only input commands from the CPU.

The analysis register (AR) 34 is a 16-bit register that is primarily used to control microprogram branches (masked branches) and the over-punch byte encode/decode logic. This register is loaded with the entire 16-bit word from the internal bus 14. The microprogrammable switch register (MPSR) 36 is an 8-bit register in which each bit can be individually set or reset under microprogram control. Each bit within the MPSR register 36 is used as a flag to facilitate microprogramming (i.e., firmware can test each of the register bits and perform branch operations, depending on the test results). Some of these bits are also used to control certain CIP 13 hardware functions.

The ROS data register (RD) 38 is a 52-bit storage register that is used to store the control store output (firmware word) for the current firmware cycle. The microprogram return address register (RSRA) 40 is an 11-bit register that is loaded from the output of the next address generation (NAG) logic 42 and is used to store the microprogram return address when executing a firmware subroutine. The register file C address multiplexer/selector (RFCA) 31 is a 4-bit, 2-to-1 selector that is capable of addressing one of the 16 locations contained within register file C (i.e., control file) 16. This selector 31 selects a combination of the function code register 28 and either counter (1) 46 or selected bits of the ROS data register 38. The CIP counters 44 include three 8-bit up/down counters 46, 48 and 50 that are defined respectively as Counter 1 (CTR1), Counter 2 (CTR2), and Counter 3 (CTR3). These counters are loaded/unloaded via the internal bus 14. The contents of each counter are available for test and branch operations.

The overpunch byte decode/encode logic 52 includes two 512-location by 4-bit PROM chips that are used to decode/encode the contents of the analysis register (AR) 34. The byte being decoded is obtained from AR bits 1 through 7 and the digit being encoded is obtained from AR bits 4 through 7. The decode/encode operation is accomplished by using AR bits 1 through 7 to address a specific PROM location. The contents of the specified PROM location are coded to conform to either: (1) the decoded digit, its sign, and its validity, or (2) the encoded overpunched byte. The MPSR 36-bit 4 specifies whether a decode or encode operation is performed, while MPSR bit 1 indicates the sign of the digit being encoded. Also, the output of the overpunch byte decode/encode logic is available on both halves of the internal bus 14.

The CIP test logic 54 selects one of 32 possible firmware test conditions for input to the next address generation logic 42. The true or false condition of the function being tested controls bit 50 of the control store next address field (i.e., sets or resets bit 50, depending on the condition of the tested function). The next address generation (NAG) logic 42 included in the CIP 13 uses one of the following five methods to generate the next firmware address: direct address, test and branch, masked branch, major branch, or subroutine return. Direct Address: this method is used when an unconditional branch is performed to the next sequential control store location. This is accomplished by using bits 41 through 51 of the control store word to form the next address. These bits comprise the next address (NA) field, which can directly address any of the available control store locations. Test and Branch: this method is used when a 2-way conditional branch (test condition satisfied) is performed within a firmware page (a firmware page being a 128-location segment within the control store). This is accomplished by using control store bits 41, 42, 43, 44 and 50 to select a test condition. Then, depending on the condition of the tested function, a branch is performed to one of two locations. The branch operation performed under this method is modulo 2 (i.e., the two possible branch addresses are two locations apart). The modulo 2 address is developed as follows: (1) if the test condition is satisfied, bit 9 of the address is set to a one, or (2) if the test condition is not satisfied, bit 9 of the address is set to a zero. Masked Branch: this method is normally used when branching on the contents of the analysis register (AR) 34 or certain other conditions, and provides branching to 2, 4, 8 or 16 locations within the same firmware page. Major Branch: this method is used when branching within a firmware page (128 words). A CPU/CIP interface routine uses this method to perform the required 16-way branch on the contents of the function code register 28. (INB Major Branch) and other control functions (EOP Major Branch). Subroutine Return: this method is used to return the firmware to the next odd or even control store location after execution of a firmware subroutine. The return address is obtained from the return address (RSRA) register 40, and must be stored in this register 40 prior to execution of the specified subroutine.

The internal bus 14 is 16-bits wide and is primarily used to transfer data between CIP registers, including locations within the register files. The internal bus receives data from several sources as shown in FIG. 2. Outputs from the internal bus 14 are fed to various registers within the CIP.

The parity checking logic 56 is coupled between the bus 19 and internal bus 14 and is used to check the parity of the incoming data. The parity generator logic 58, on the other hand, is used to generate the correct parity bit for transfer over the bus 19.

The bus request logic 60 and the bus response logic 62 are utilized for the purpose of enabling the CIP to gain access to the bus 19 and to respond to any requests to gain access to the CIP. Logic 60 and 62 are described in U.S. Pat. No. 3,993,981.

Figure 5:
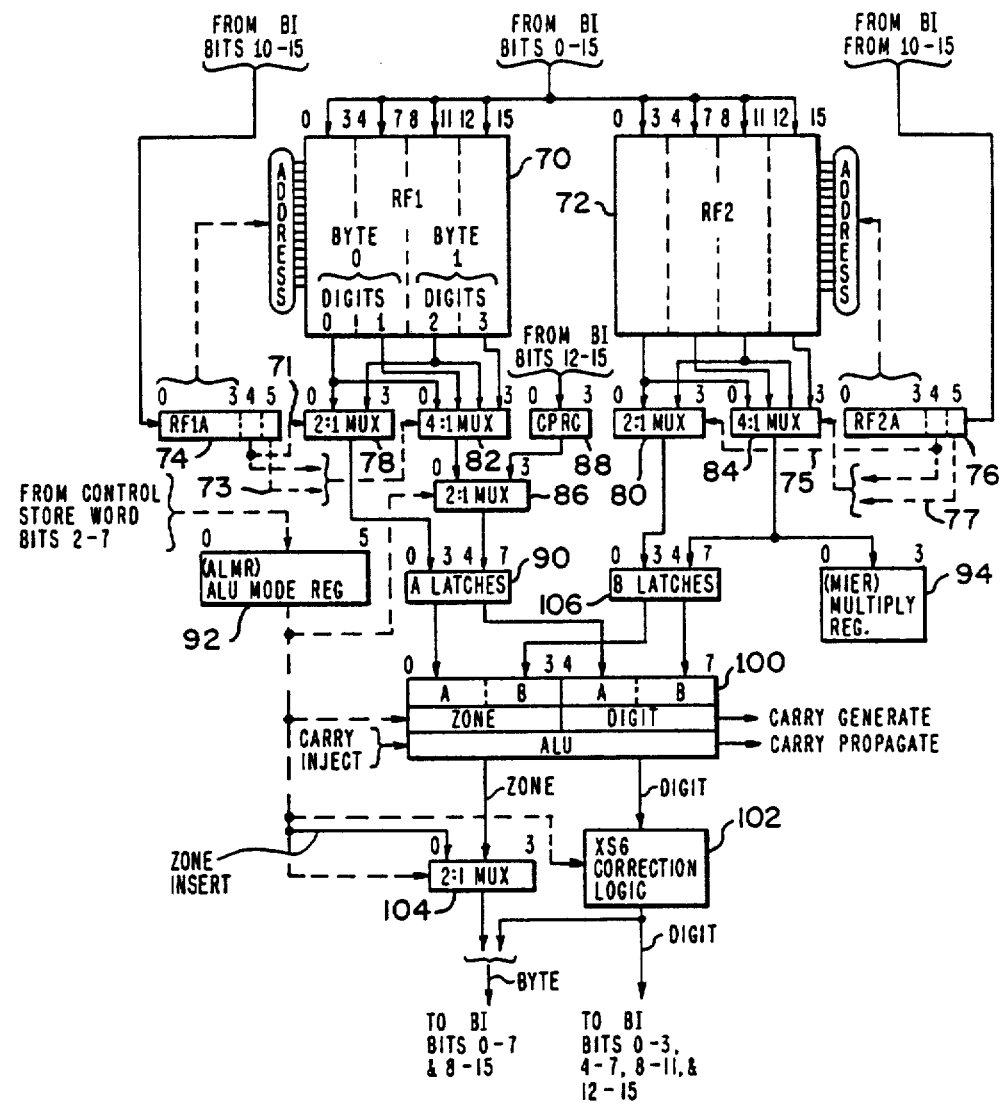
FIG. 5 is a detailed block diagram of the arithmetic unit utilized with the present invention.

FIG. 5 is a major block diagram of the RALU 12, showing all major data transfer paths and control lines. The control lines are shown as dashed lines for ease of understanding its operation. For convenience, the description of the RALU is divided into seven areas: Operand Register Files, ALU Input Multiplexers and Latches, Arithmetic Logic Unit, XS6 Correction Logic, ALU Output Multiplexer, RALU Control Logic, and Miscellaneous RALU Registers. Operand register files RF1 70 and RF2 72 each consist of four RAM chips that are used as temporary storage for CIP operands. Addresses for each of the register files are supplied by two 6-bit address registers (RF1A 74 and RF2A 76, respectively). Bits 0 through 3 of each address register supply the address of the location within the associated register file, while the low order bits provide for byte and digit selection at the output of the register file. Both of these address registers can be incremented or decremented by 1, 2 or 4 (i.e., by digits, bytes, or words). As shown in FIG. 5, the output from each register file is fed to the inputs of two multiplexers (i.e., a pair of multiplexers for each register file) that select between zone and digit information. The selection is accomplished by bits 4 and 5 of the associated address register. Bit 4 selects whether bits 0 through 3 or 8 through 11 (from the register file) are fed to the output of the 2-to-1 multiplexers 78 or 80 respectively, while bit 5 selects the register file bits that comprise the digit being fed to the output of the 4-to-1 multiplexers 82 or 84 respectively.

The various registers and multiplexers are coupled for control by various control lines, shown as dotted lines, and including, for example, control lines 71, 73, 75 and 77. A third 2-to-1 multiplexer 86 is used to select whether the contents of the current product counter (CPRC) 88 or the digit from RF1 is delivered to the A latches 90. This multiplexer is controlled by the ALMR register 92. The ALU input latches, A latches 90 and B latches 106, receive both zone and digit information from the ALU input multiplexers, and latch the data into the register files during write operations. The outputs from the latch circuits feed the zone and digit information to the left and right sides of the ALU, respectively.

The current product counter (CPRC) is a 4-bit decimal up/down counter that is primarily used during execution of decimal multiply and divide operations. The multiplier register (MIER) 94 is a 4-bit binary up/down counter that is primarily used during decimal multiply and divide operations. The ALU mode control register (ALMR) 92 is a 6-bit control register that is used to control all ALU operations. The register file 1 address register (RF1A) 74 is a 6-bit address register that performs two functions: (1) provides addresses for register file 1 (70), and (2) controls two of the three ALU input multiplexers associated with register file 1. The register file 2 address register (RF2A) 76 is a 6-bit address register that performs two functions: (1) provides addresses for register file 2 (72), and (2) controls the ALU input multiplexers associated with register file 2. All arithmetic logic unit (ALU) 100 operations are performed in either the decimal or binary mode. Decimal mode is used when operating with decimal digit information, while binary mode is used for byte (Alpha) operations. Both modes of operation also control the excess 6 (XS6) correction logic 102 and the inputs to the carry flip-flop. In decimal mode, the carry flip-flop is loaded with the carry from the low-order four bits of the ALU, while in binary mode, it is loaded with the carry from the eight bits of the ALU for subsequent arithmetic operations. The carry flip-flop is loaded under microprogram control when a carry must be propagated for subsequent operations. In addition, the carry flip-flop can be loaded from the MSR register, and set or reset under microprogram control.

The XS6 correction logic 102 has one 32-bit by 8-bit PROM chip and the associated control logic to correct the high-order three bits from the digit output of the ALU. XS6 correction is performed if: (1) the ALU is in decimal add mode and a decimal carry is encountered or the digit output of the ALU 100 is greater than 9, and (2) in the decimal subtract mode, if a borrow is encountered (i.e., absence of a carry from the digit portion of the adder). The PROM chip has five address lines. Three of these lines consist of the three highorder bits from the digit output of the ALU, while the other two address lines indicate the type of operation being performed (i.e., add correction, subtract correction, or no correction). The coded contents of the PROM chip are the three high-order corrected bits of the digit, the corrected decimal carry, and the digit less than 2 condition.

The ALU output multiplexer 104 selects between the upper four bits of the adder output and the corrected decimal zone bits for delivery to the internal bus. The configuration of the zone bits (for decimal mode) depends on whether ASCII or EBCDIC data is being used (i.e., if ASCII data is being used, the zone bits are forced to a value of 3; if EBCDIC data is being used, the zone bits are forced to a value of F).

The RALU controls consist of registers RF1A 74, RF2A 76, and ALMR 92 plus various RALU related microinstructions. In addition, the ALU carry flip-flop is under microprogram control. The carry flip-flop can be precleared or preset, (as required), by the respective microinstructions, and can be loaded from: (1) the 4-bit digit carry for decimal operations, (2) the 8-bit binary carry for binary operations, or (3) bit 0 of the MSR register 22 during execution of conversion instructions. The ALMR register 92, which controls all ALU operations, is loaded from control store bits 2 through 7. Bit 0 specifies whether the ALU operates in decimal or binary mode; i.e., whether the carry out of the ALU is from bit 4 (digit carry) or bit 0 (binary carry). Bit 0 also controls both the ALU correction (XS6) for decimal operations and the ALU output multiplexer 104; the multiplexer determines whether the high-order four bits of the ALU or the forced zone bits are gated to the internal bus 14. Bits 1, 2 and 3 are used to control operations within the ALU. Bit 4 specifies whether the zone bits are forced to a value of 3 or F (i.e., for ASCII data, the zone bits are forced to a value of 3; for EDCDIC data, the zone bits are forced to a value of F). Bit 5 specifies whether the selected digit from register file 1 or the contents of the current product counter 88 are gated to the latches 90 associated with the left side of the ALU. Register RF1A provides the address and controls for register file 1 and the associated ALU input multiplexers. Register RF2A provides the addresses and controls for register file 2 and the associated ALU input multiplexers.

The control file 16 is divided into two sections: the upper section (bits 0 through 7) and the lower section (bits 8 through 23). Each section of the control file can be loaded as follows: RFC lower from the internal bus (bits 0 through 15), RFC upper from the internal bus (bits 0 through 7), RFC lower from the internal bus (bits 0 through 15), and RFC upper from the bus address register 18 (bits 0 through 7). The functions used to implement the above operations have an address associated with them, which address corresponds to the RFC 16 location being loaded. This address originates from either the function code register 28 or the control store 10. Thus, the RFC address is directly related to the type of data being delivered by the CPU 11, or as indicated by the function code.

The present invention utilizes search and verify instructions each of which contain three data descriptors. These three data descriptors define, for example, alphanumeric data to be used by the search and verify instructions. When the CPU 11 detects a CIP instruction similar to a search and verify instruction which requires the three data descriptors for execution, it decodes the three data descriptors and calculates the effective addresses for all three operands. It then transmits this information to the CIP for the execution of the instruction. In the case of the search and verify instructions, the information is the taskword which is the op-code of the search instruction or the verify instruction. Data descriptor 1 (DD1) defines the first operand, data descriptor 2 (DD2) defines the second operand and data descriptor 3 (DD3) defines the third operand. Associated with these three operands are three effective addresses which point to the starting location which is the left most location of the operand in main memory. There may be associated with these three operands, length-defining codes stored in three different CPU registers, if the data descriptor so specifies. Such information once collected by the CPU 11, is transmitted via the bus 19 to the CIP 13. This transfer of information from the CPU to the CIP takes place while the CIP is in the load state. This instruction related information is loaded into the control file 16 under control of the addresses via the function code register BFCR 28.

The description of the search instruction (SRH) shall now be provided followed by examples thereof. Initially, a search of the third operand defined by DD3 is made to determine if it contains any one of the search arguments (one or more) contained in the search list defined by DD1 (operand 1). If a match is found, then an equal indication is posted (i.e., G=0, L=0) and operand 2 (DD2) will be loaded with the displacement d, where d defines the relative distance in bytes between the origin of the operand 3 (DD3) and the place where the first match was found, and the search argument number, defining (whenever multiple search arguments are specified in the search list) which of the search arguments caused the match. If a match is not found, then a nonequal indication is posted (i.e., G=0, L=1) and operand 2 (DD2) is left unmodified.

The three descriptors define the following. DD1 defines the operand 1 which is the search list (SL). The SL can contain one or more search arguments (SA) and an SA can consist of one or more characters. If the length (L) of operand 1 specified in DD1 is not equal to 0, then the SL consists of only one SA. The SA length is defined by L where $1 \leq L \leq 31$. If the L field specified in DD1=0, then the length is indirectly taken from a CPU register. Such register has 16 bits wherein bits 0–7 include the SA length ($SA_L$) and bits 8–15 include the SL length ($SL_L$). $SL = n(SA)$, where n is the largest integer contained in the ratio of $SL_L/SA_L$. For $SA_L = SL_L$, then SL consists of only one SA with length equal to $SA_L$. For $n \times SA_L = SL_L$, then SL consists of n SAs. Each SA's length is equal to SA. With the above noted use of such CPU register, multiple searches can be performed by a single instruction.

DD2 defines the second operand which is always two words in such memory into which the displacement and search argument number are loaded following the detection of a match. Word 1 (16 bits) includes the SA number and word 2 (16 bits) includes the displacement, where the SA number and the displacement are binary quantities. If no match is found, then DD2 remains unchanged. It is noted that operand 2's length, i.e., DD2 (L), must be four bytes and word aligned, otherwise unspecified results will occur.

DD3 defines the operand to be searched. The operand can be a string (SO) or an array (AO). If the length (L) of operand 3 specified in DD3 is not equal to 0, then the operand is an SO. The length of the SO is defined by L where: $1 \leq L \leq 31$. If the L field specified in DD3=0, then there is an escape to another CPU register (16 bits) which has the following format. Bits 0–7 include the operand element length ($OE_L$), and bits 8–15 include the operand length (OL). For $OE_L = 1$, the operand is a string of length OL. For $OE_L$ not equal to 1, then the operand is an array and its length is the largest multiple of $OE_L$ which is $\leq OL$. The length of each element in the array is equal to $OE_L$. It is noted that $1 \leq OL \leq 255$. Given an AO, then if the $SA_L > OE_L$, each search will overflow into the next entry, except that when searching the last OE, no overflow will occur and consequently this last compare will result in a noncompare. If the length of any of the three operands is zero, then there is a trap condition.

The Search instruction can be classified into four distinct cases: (1) Search String Single (i.e., search a string to determine if it contains the single search argument given in the search list); (2) Search String Multiple (i.e., search a string to determine if it contains any one of the multiple search arguments given in the search list); (3) Search Array Single (i.e., search an array to determine if it contains the single search argument given in the search list); and (4) Search Array Multiple (i.e., search an array to determine if it contains any one of the multiple search arguments given in the search list). The search arguments may be referred to as search indicia and the data in operand 3 to be searched may be referred to as elements to be searched. Each element comprises a number of characters which are compared with the characters of one of the search indicia in a compare operation. The following are examples for each such case.

For search string single, DD1 defines the search list and contains one search argument. The SA can consist of one or more characters. DD2 is used such that if a match is found, then a zero is stored in DD2 for search argument number and the displacement. DD3 defines the string to be searched. Given the string for the search list to be a b c d e f g h i j d e k, in positions respectively of 0 1 2 3 4 5 6 7 8 9 A B C, then with the SA as shown in the following six examples, an equal or not equal indicator is posted and the result (DD2) is indicated as follows:

(1) for SA=d then post an=and set DD2=0,3, (only one SA, then SA number is zero, d is found in position 3);
(2) for SA=f g then post an=and set DD2=0,5;
(3) for SA=f h then post an≠and set DD2=unchanged;
(4) for SA=d e k then post an=and set DD2=0, A;
(5) for SA=l m then post an≠and set DD2=unchanged; and
(6) for SA=a then post an=and set DD2=0,0.

For search string multiple, DD1 defines the search list and contains multiple search arguments, the length of an SA can be one or more characters but all SAs must have the same length. This case requires the usage of a CPU register which contains the $SA_L$ and the $SL_L$. DD2 is used such that if a match is found, then the search argument number and the displacement are stored in DD2. DD3 defines the string. Given the string to be as stated above for the search string single example, the following five examples illustrate the operation:

(1) for $SA_L=1$, $SL_L=3$ (f,e,j) then post an=and set DD2=1,4 (first occurrence was the e of SA, in the fourth position);
(2) for $SA_L=1$, $SL_L=2$ (r,s) then post an≠and set DD2=unchanged;
(3) for $SA_L=2$, $SL_L=6$ (de,hi,er) then post an=and set DD2=0,3;
(4) for $SA_L=3$, $SL_L=6$ (cdf,hij) then post an=and set DD2=1,7; and
(5) for $SA_L=2$, $SL_L=4$ (cb,ka) then post an≠and set DD2=unchanged.

For search array single, DD1 defines the search list and contains one search argument. The SA can consist of one or more characters. DD2 is used such that if a match is found, then a zero is stored in DD2 for search argument number and the displacement. DD3 defines the array. This case requires the usage of a register in the CPU which contains the $OE_L$ and the OL. The following eight examples are based upon the following exemplary array where the CPU register specifies $OE_L=4$ and $OL=24$.

| Address | Array |
|---------|-------|
| 00 | a b d f |
| 04 | a c b e |
| 08 | c a d e |
| 0C | d e f g |
| 10 | m j o p |
| 14 | e a c b |

The following examples illustrate the operation of the Search Array Single:
(1) for SA=ca then post an=and set DD2=0,08;
(2) for SA=a then post an=and set DD2=0,00;
(3) for SA=mjo then post an=and set DD2=0,10;
(4) for SA=mjpo hen post an≠and set DD2=unchanged;
(5) for SA=acbec then post an=and set DD2=0,04;
(6) for SA=eacba then post an≠and set DD2=unchanged;
(7) for SA=bac then post an≠and set DD2=unchanged; and
(8) for SA=cade then post an=and set DD2=0,08.

For Search Array Multiple, DD1 defines the search list and contains multiple search arguments. The length of an SA can be one or more characters but all SAs must have the same length. This case requires the usage of a CPU register which contains the $SA_L$ and the $SL_L$. DD2 is used such that if a match is found, then the search argument number and the displacement are stored in DD2. DD3 defines the array. This case requires the usage of another CPU register which contains the $OE_L$ and the OL. The following six examples are based upon the following exemplary array where the CPU register specifies $OE_L=4$ and OL=24.

| Address | Array |
|---------|-------|
| 00 | a b d f |
| 04 | a c b e |
| 08 | c a d e |
| 0C | d e f g |
| 10 | m j o p |
| 14 | e a c b |

The following examples illustrate the operation of the Search Array Multiple:
(1) for $SA_L=3$, $SL_L=6$ (acb,acd) then post an=and set DD2=0,04;
(2) for $SA_L=1$, $SL_L=3$ (c,a,d) then post an=and set DD2=1,00;
(3) for $SA_L=4$, $SL_L=8$ (defg,abcd) then post an=and set DD2=0,0C;
(4) for $SA_L=2$, $SL_L=6$ (ad,ea,mj) then post an=and set DD2=2,10;
(5) for $SA_L=3$, $SL_L=9$ (aab,abb,eac) then post an=and set DD2=2,14; and
(6) for $SA_L=5$, $SL_L=10$ (abdfb,mjope) then post an=and set DD2=1,10.

A description of the verify instruction (VRF) shall now be provided followed by examples thereof. Initially, there is a verify that each of the characters or elements of the third operand defined by DD3 is a member of the set of Verify arguments contained in the verify list defined by DD1 (operand 1). If at least one character or element of the operand does not match any one of the verify arguments, then a nonequal indication is posted (i.e., G=0, L=1) and DD2 (operand 2) will be loaded with the displacement d, where d defines the relative distance between the origin of the operand and the place where the first noncompare was found. If each of the characters or elements of the third operand is equal to one of the verify arguments defined by DD1, then an equal indication is posted (i.e., G=0, L=0) and DD2 (operand 2) is left unmodified. The verify arguments may be referred to as verify indicia and the data in operand 3 to be verified may be referred to as elements to be verified. Each element comprises a number of characters which are compared with the characters of one of the verify indicia in a compare operation. The three descriptors define the following.

DD1 defines the first operand which is the verify list (VL). The VL can contain one or more verify arguments (VA) and a VA can consist of one or more characters. If the length (L) of operand 1 specified in DD1 is not equal to 0, then the VL consists of only one VA. The VA length is defined by L where $1 \leq L \leq 31$. If the L field specified in DD1=0, then the length is determined from a CPU register which has the following format: the bits 0-7 include the VA length ($VA_L$) and bits 8-15 include the VL length ($VL_L$). For $VA_L=VL_L$, VL consists of only one VA with length equal to $VA_L$. For $n \times VA_L=VL_L$, VL consists of n VAs, each VA's length being equal to $VA_L$. Note that $1 \leq VL_L \leq 31$.

DD2 defines the second operand which is always a word in main memory into which the displacement is loaded following the detection of a noncompare. The displacement is a binary quantity. If all the characters or elements of the operand verify, the DD2 remains unchanged. Operand 2's length, i.e., DD2 (L) must be two bytes and word aligned, otherwise unspecified results occur.

DD3 defines the third operand which is to be verified. The operand can be a string (SO) or an array (AO). If the length (L) of operand 3 specified in DD3 is not equal to 0, then the operand is an SO. The length of the SO is defined by L where $1 \leq L \leq 31$. If the L field specified in DD3=0, then there is an escape to another CPU register which has the following format: bits 0-7 include the operand element length ($OE_L$), and bits 8-15 include operand length (OL). For $OE_L=1$, the operand is a string of length OL. For $OE_L$ not equal to 1, the operand is an array and its length is the largest multiple of $OE_L$ which is $\leq OL$. The length of each element in the array is equal to $OE_L$. Note that $1 \leq OL \leq 255$. It is also noted that given an SO, then $VA_L$ should be equal to one, otherwise unspecified results will occur and given an AO, then if the $VA_L > OE_L$, each verify will overflow into the next entry except when verifying the last OE, no overflow will occur and consequently this last verify will result in a noncompare. Further, if the length of any of the three operands is zero, then there is a trap condition.

As with the Search instruction, the Verify instruction can be classified into four distinct cases:
(1) Verify String Single (i.e., verify a string to determine if its characters are all equal to the single verify argument given in the verify list);
(2) Verify String Multiple (i.e., verify a string to determine if its characters are each equal to one of the multiple verify arguments given in the verify list);
(3) Verify Array Single (i.e., verify an array to determine if its elements are all equal to the single verify argument given in the verify list); and
(4) Verify Array Multiple (i.e., verify an array to determine if its elements are each equal to one of the multiple verify arguments given in the verify list). The following are examples for each such case.

For Verify String Single, DD1 defines the verify lists and contains one verify argument. If a noncompare is found, then the displacement is stored in DD2. DD3 defines the string. Given the string to be a a a b a a c in positions 0 1 2 3 4 5 6 respectively, then the following two examples are provided:

(1) for VA=a then post an≠and set DD2=3; and
(2) for VA=b then post an≠and set DD2=0.

By way of further example, given the string b b b b b b b in positions 0 1 2 3 4 5 6 respectively, then there is an equal comparison indicated by the example where VA=b, whereupon the system waved post an=and set DD2=unchanged.

For Verify String Multiple, DD1 defines the verify list and contains multiple verify arguments. The length of a VA should be one character. This case requires the usage of a CPU register which contains the $VA_L$ and $VL_L$. If a noncompare is found, then the displacement is stored in DD2. DD3 defines the string. By way of example, given the string a b c b b a d b c c in positions 0 1 2 3 4 5 6 7 8 9 respectively, then (1) for VA=a,b then post an≠and set DD2=2 (2 is the position there where was the first mismatch, i.e., c is not included in VA);
(2) for VA=a,b,c,e then post an≠and set DD2=6; and
(3) for VA=a,b,c,d then post an=and set DD2=unchanged.

For Verify Array Single, DD1 defines the verify list and contains one verify argument. The VA can consist of one or more characters. If a noncompare is found, then the displacement is stored in DD2. DD3 defines the array. This case requires the usage of another CPU register which contains the $OE_L$ and the OL. By way of example, the following array where such CPU register specifies $OE_L$=3 and OL=12, is given.

| Address | Array |
| --- | --- |
| 0 | a b a |
| 3 | a b c |
| 6 | a b d |
| 9 | a c b |

The following four examples illustrate the operation:
(1) for VA=ab then post an≠and set DD2=9 (first mismatch is at address a);
(2) for VA=abc then post an≠and set DD2=0;
(3) for VA=a then post an=and set DD2=unchanged; and
(4) for VA=abaa then post an≠and set DD2=3.

For Verify Array Multiple, DD1 defines the verify list and contains multiple verify arguments. The length of a VA can be one or more characters but all VAs must have the same length. This case requires the usage of a CPU register which contains the $VA_L$ and the $VL_L$. If a noncompare is found, then the displacement is stored in DD2. DD3 defines the array. This case requires the usage of another CPU register which contains the $OE_L$ and the OL. By way of example, the following array where such CPU register specifies $OE_L$=4 and OL=16, is given.

| Address | Array |
| --- | --- |
| 0 | a b c d |
| 4 | a c d b |
| 8 | b c a d |
| C | a c b d |

The following four examples illustrate the operation:
(1) for VA=ab, ac then post an≠and set DD2=8 (first mismatch is at address 8);
(2) for VA=ab, ac, bc then Post=and set DD2=unchanged;
(3) for VA=abc, acd, acb then post an≠and set DD2=8; and
(4) for VA=abcd, acbd then Post≠and set DD2=4.

Figure 6A:
FIGS. 6A, 6B, 6C and 6D illustrate the format of operands used in conjunction with the present invention.
Figure 6B:
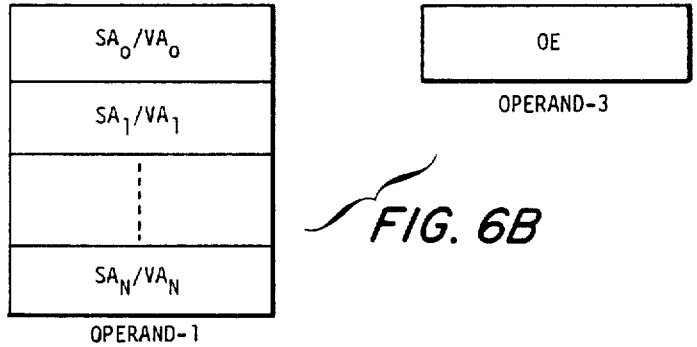
Figure 6C:
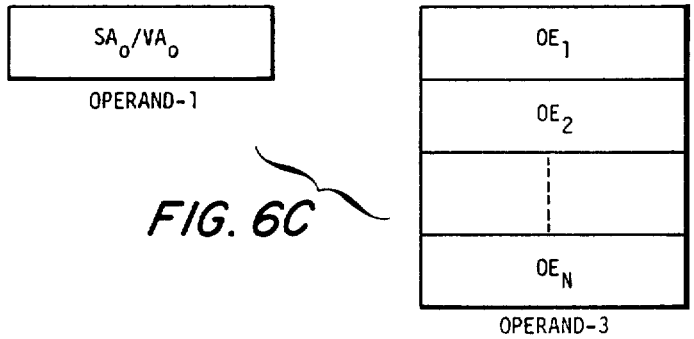
Figure 6D:
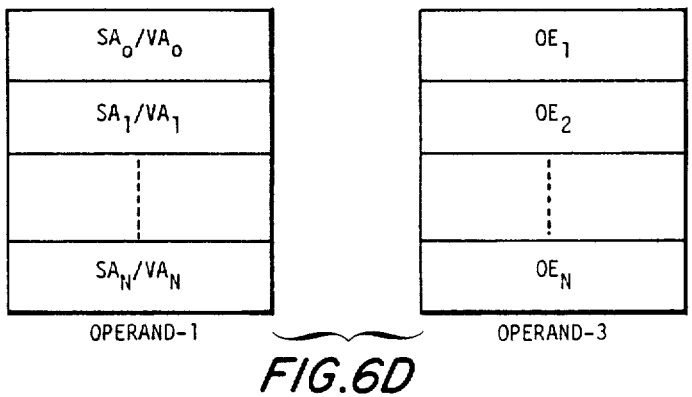

FIGS. 6A, 6B, 6C and 6D provide a diagrammatic explanation of the layout of the two operands, operand 1 and operand 3, in the four separate cases of the two instructions, alphanumeric search and alphanumeric verify. The four cases are (i) search or verify string single, (ii) search or verify string multiple, (iii) search or verify array single and (iv) search or verify array multiple. FIG. 6A is an illustration for the search or verify string single where operand 1 contains the search argument or the verify argument as the case may be, and operand 3 contains the operand 0 which has to be searched. FIG. 6B depicts the case for the search string multiple or the verify string multiple. In this case, the search list or the verify list, SL or VL, contains multiple search arguments (SAs) or verify arguments (VAs), which are shown as operand 1 being $SA_1$, $SA_2$ through $SA_N$ or $VA_1$, $VA_2$ through $VA_N$. Operand 3 as described just above is the string of data which needs to be searched or verified, as the case may be, for at least one of those search or verify arguments defined by operand 1. FIG. 6C shows the representation of the memory in the case of the search or verify array single instruction. Operand 1 is now a single argument, either a search argument (SA) or a verify argument (VA). Operand 3 in this case includes a multiple of elements or entries called operand element 1, operand element 2, etc. through operand element N. The entire contents of operand 3 are divided into a multiple array of elements. FIG. 6D is a diagrammatic explanation for the case of the search array multiple or the verify array multiple instruction. In this case, operand 1 is similar to that in FIG. 6B, that is, it contains multiple arguments in the search list (SL) or the verify list (VL). These arguments are defined as the search arguments $SA_1$, $SA_2$, etc., or the verify arguments $VA_1$, $VA_2$, etc., as the case may be. Operand 3 once again defines an array of elements which have to be searched, these elements being operand element one, $OE_1$, $OE_2$ through $OE_N$.

Figure 7:
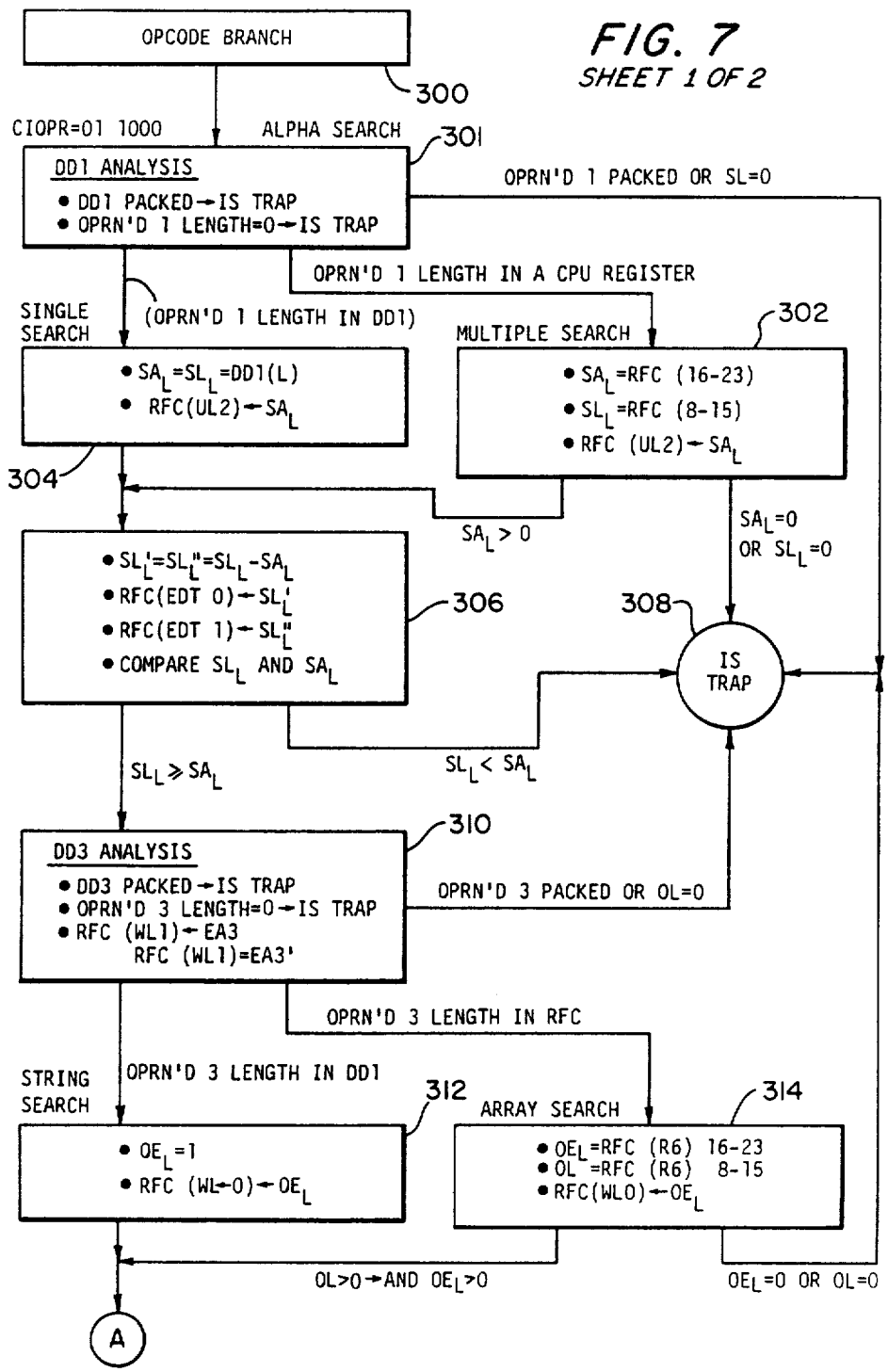
FIG. 7 is a detailed flow diagram illustrating the operation of the alphanumeric search and verify apparatus and method of the present invention.
Figure 7:
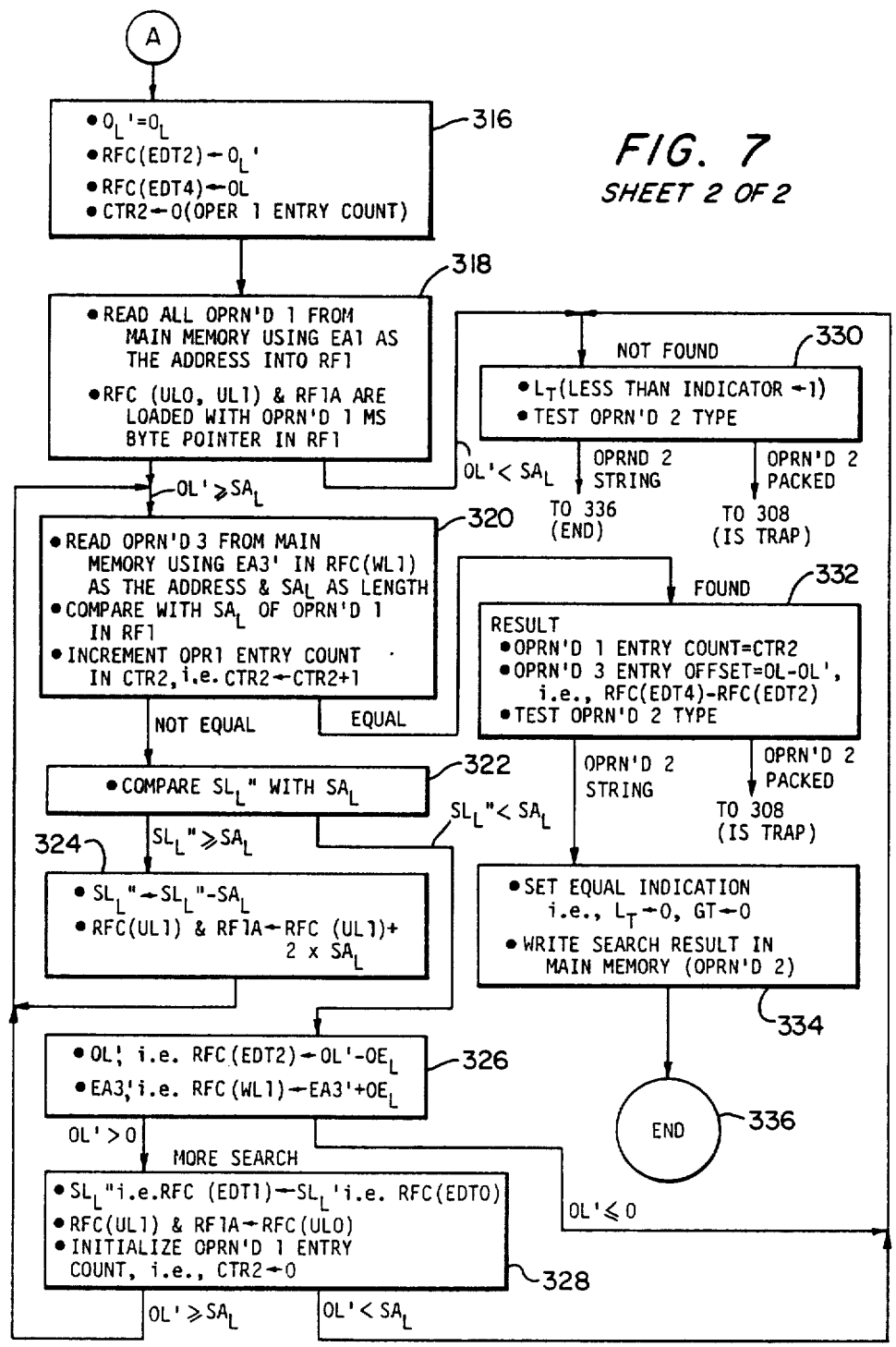

FIG. 7 is a flow chart illustrating the operation of the alphanumeric search instruction and shows the firmware flow and the hardware flow for the execution of the search instruction within the CIP 13. After the instruction related information has been loaded by the CPU 11 via the bus 19 into the control file RFC during the loading stage, the CIP hardware performs an op-code branch depicted by block 300. This branch is performed on the contents of the op-code register CIOPR, and, for example, if the contents thereof are 011000 (hexidecimal number 28), this indicates an alphanumeric search instruction. Upon detection of an alphanumeric instruction via the op-code branch, the CIP firmware enters a routine depicted by the block 301 of FIG. 7. In this block 301, the CIP performs a data descriptor 1 (DD1) analysis, that is, it analyzes the data descriptor referring to operand 1. There are two items checked for in this block 301, (i) whether the data descriptor 1 specifies the operand 1 to be a so-called packed operand or (ii) whether DD1's length is equal to zero. To determine whether it is a packed operand, bit 8 of data descriptor 1, which has been loaded into the analysis register AR34 of FIG. 3, is checked. If the analysis register-bit 8 is a binary one (1), this indicates a packed operand and the firmware generates an illegal specification trap (IS trap). The other condition tested for in this block is whether the data descriptor 1 specifies a length of zero. If the length specified in DD1, which is bits 3 through 5 of the data descriptor, is zero, then the length is provided by a CPU register. If operand one's length as specified in the CPU register is also zero, an illegal specification trap is entered.

The operation continues from block 301 to one of three suboperations. One is the case where operand 1 is packed or the search list length is equal to zero which causes an illegal specification trap causing operation to take place at block 308. Another case is where operand one's length, in the data descriptor 1, as specified by DD1 bits 3 to 5, is not equal to zero. In this case, block 304 is entered, which specifies a single search operation. In the third case, where operand one's length in DD1 is zero, but the length is in the CPU register, block 302, for the multiple search operation, is entered. In block 304, for the single search, the search argument length (SA$_L$) is equal to the search list length (SL$_L$), which are equal to the length specified in data descriptor 1. The search argument length is loaded into an RFC location (UL2), which is a work location within the control file RFC 23. In block 302, the search argument length comes from a predeteremined location in register file C (bits 16 through 23), and the search list length comes from a predetermined location in the RFC (bits 8 through 15). In this block 302, control file C, location UL2, is also loaded with the search argument length from the predetermined control file C location (bits 16 through 23). In block 302, a further test is made to determine whether the search argument length (or the search list length) is equal to zero. If the length is equal to zero, an illegal specification trap takes place and block 308 is entered. If SA$_L$ is greater than zero, block 306 is entered. Block 306 is also entered from block 304 unconditionally.

In block 306, the difference between the lengths of SL$_L$ and SA$_L$ is loaded into the control file C locations. EDT0 and EDT1, which are once again work locations used by the firmware. The contents of RFC EDT0 are called SL$_L$' and the contents of RFC EDT1 are called SL$_L$''. These two, SL$_L$' and SLL$_L$'', are used during the execution of the single search instruction. It is noted that SL$_L$' is the initial value of the difference between SL$_L$ and SA$_L$. Initially, SL$_L$' and SL$_L$'' are equal.

In block 306 a comparison of the length of SL$_L$ and SA$_L$ is made. If SL$_L$ is less than SA$_L$, that is the search list length is less than the search argument length, then an illegal specification trap takes place and block 308 is entered. If SL$_L$ is greater than or equal to SA$_L$, then block 310 is entered. It should be noted that this comparison of SL$_L$ and SA$_L$ and also further comparisons of other lengths are performed within the ALU 100 of the CIP 13.

The ALU is shown in detail in FIG. 5. The two lengths to be compared are loaded into predetermined locations of the register files RF1 and RF2 and the ALU 100 is made to do a binary subtract operation under control of the ALU mode register 92. The result of the comparison is tested by the next address generation logic and one of two branches takes place depending on the results of the compare.

The block 310 is a series of firmware steps by which the analysis of data descriptor 3 is performed. The data descriptor 3 describes the third operand, which is the operand to be searched. Once again, if operand 3 is a packed operand, a trap takes place and block 308 is entered. Also, if the length of operand 3 is zero, as specified in the RFC location, a trap is also entered. The third operation performed in this block 310 is the loading of the effective address three (EA3) of operand 3, into a work location in the register file C, specifically RFC location WL1. The contents of WL1 will be used as an effective address 3' (EA3'), to provide a moving pointer within the operand pointed to by DD3. Exits from block 310 are performed to either block 312 or block 314, depending upon whether operand three's length is in data descriptor 3 or whether the length for operand 3 was taken from location R6 in the RFC. The latter case is performed when the length field in DD3, that is bits 2 through 7, are zero. These bits, bits 2 through 7, are once again tested, loading bits 2 through 7 into one of the counters CTR1, CTR2 or CTR3 by performing a 5-bit load into one of the counters and testing for its contents to be zero.

Block 312 is entered if operand three's length (OE$_L$) was in the data descriptor, in which case the instruction specifies a string search. Accordingly, the operand element length is equal to a one, that is, it is forced to be equal to a one and this is loaded into the control file C location WL0 to be used later in the execution process. Block 314 is entered from block 310 if the operand 3 length came from RFC (R6). The operand element length (OE$_L$) is taken from register file C location R6, bits 16 through 23, and the operand length (OL) is taken from register file C location R6, bits 8 through 15. The operand element length (OE$_L$) is loaded into the register file C WL0 location from bits 16 through 23 of RFC R6. In block 314, if OE$_L$ or OL are equal to zero, an illegal specification trap takes place and block 308 is entered. If OL is greater than zero and OE$_L$ is greater than zero, block 316 is entered. Also, block 316 is unconditionally entered via block 312.

In block 316, OL' is initialized to be equal to OL and is loaded into the control file C location EDT2, and OL is loaded into register file C location EDT4. The item OL' is used by the firmware as a progressive indicator of the length of operand 3 as the operand elements in operand 3 are sequentially searched. The operation of block 316 unconditionally goes to that of block 318 at which time the operand 1 entry count in counter 2 (48) is initialized to zero. Block 318 provides that a series of firmware words perform the following operations. One is the reading of the entire operand 1 from the main memory using the contents of effective address 1 in the RFC as the starting address. The data read, which is operand 1, is loaded in its entirety into register file RF1 70. Secondly, the address of the most significant byte of operand 1 in register file 1 is loaded into the register file 1 address register RF1A 74, and is also loaded into two work locations within the control file C, which are RFC locations UL0 and UL1. The location UL0 is saved as the starting location of the operand 1, while the contents of UL1 are updated for every entry in operand 1 which corresponds to the most significant address for that particular search argument. In block 318, a test is performed to determine whether the remaining operand 3 length, i.e., OL', is less than the search argument length (SA$_L$). If OL' is less than SA$_L$, then block 330 is entered which indicates a not found condition, that is, the search argument was not found in operand 3. However, if OL' is equal to or greater than SA$_L$, block 320 is entered which indicates that a search has to be performed. The search to be performed is a comparison of operand 1 and operand 3.

In block 320, the operand 3 is read from main memory using EA3' from register file C, location WL1, as the starting address, and the search argument length SA$_L$ as its length. The data read from main memory for operand 3 is then compared with the data in the register file 1 up to the length of SA$_L$. Thus, the search argument is compared with a corresponding length of operand 3. Also, the operand 1 entry count which is used as a result of this instruction is incremented in the counter 2 48, it being noted that counter 2 is initialized to zero coming from box 316 to the operation of block 318. The result of the comparison of operand 3 and the search argument in register file 1, which corresponds to an entry in operand 1, is tested. If the comparison is not equal, block 322 is entered. If the comparison indicated an equality, block 332 is entered, which indicates that the item searched for was found in operand 3.

In block 322, SL$_L''$ is compared with the SA$_L$. SL$_L''$ indicates the remaining length of operand 1. If the remaining length, that is SL$_L''$, is less than the search argument length (SA$_L$), then block 326 is entered, which indicates that there are no more search arguments (SA$_L$) left in operand 1 to be compared with this particular entry (OE) of operand 3. If the remaining length of operand 1, that is SL$_L''$ is greater than or equal to the search argument length (SA$_L$), then block 324 is entered. This indicates that there is at least one more search argument remaining in the operand 1 yet to be compared with this particular entry of operand 3. In block 324, SL$_L''$ is updated to its prior value minus the search argument length. That is, SL$_L''$ is loaded with SL$_L''$ minus SA$_L$, which will be used for the comparison process the next time block 322 is entered. The contents of register file C, location UL1, which contains the most significant byte pointer of the last used search argument, is updated to point to the most significant byte of the next search argument, which is going to be compared with this operand entry (OE) in operand 3. This is done by adding two times the search argument length, which length is equal to the number of bytes in the search argument, to the previous contents of RFC UL1. Adding two times the SA$_L$ is needed because the address pointer mechanism for the RF1A and RF2A registers are normally addressed on a digit (4 bits) basis which must be adjusted for when addressing on a byte (8 bits) basis. The updated contents of RFC UL1 are also loaded into the register file C, location UL1, and RF1A 74, to be used as a starting pointer of the next search argument in operand 1. From block 324, an unconditional branch to block 320 is taken whereby this new search argument of operand 1 is compared with the same operand entry of operand 3.

Block 326 is entered from block 322 if the remaining length of operand 1, which is SL$_L''$, is less than the search argument length. This indicates that there are no more search arguments in operand 1 to be compared with this particular operand entry in operand 3. In block 326, OL', which is the remaining length of operand 3, is updated by subtracting the length of one operand element from the previous contents of OL'. Furthermore, the starting address of this particular operand element in operand 3 is updated in register file C, location WL1, and a new value of EA3' is generated. The new value of EA3' is arrived at by adding the prior contents of EA3' with the length of operand entry of operand 3, and this new address is loaded into RFC location WL1. In block 326, a further test is made on OL', which is the remaining length of operand 3 yet to be searched. If this remaining length OL' is less than or equal to zero, block 330 is entered, which indicates that there are no more entries in operand 3 to be searched and a "not found" indication has to be reported. If the remaining length OL' of operand 3 is greater than zero, block 328 is entered.

In block 328, the remaining length of operand 1 SL$_L''$ is reinitialized from the original contents of SL$_L'$ in RFC location EDT0, and the new contents of SL$_L''$ are loaded into register file C location EDT1. Further, the pointer to the most significant byte of the search argument in operand 1 is reinitialized to point to the first search argument in operand 1 which has been saved in location UL0 of register file C as a result of the operation of block 318. This updated value of the pointer to the most significant byte of the search argument is also loaded into register file 1 address register RF1A 74 to be used during comparison with operand 3 per the operation of block 320. Further, the operand 1 entry count is initialized to zero in counter 2. In block 328 a comparison is also made between the remaining length of operand 3, which is OL', and the search argument length (SA$_L$). If OL' is less than SA$_L$, which indicates that there are not enough bytes left in operand 3 to be compared with the search argument, block 330 is entered which once again indicates that a "not found" condition exists. However, if OL' is greater than or equal to SA$_L$, block 320 is entered, whereby an additional search is performed.

Block 330 is entered from either block 318, block 326 or block 328. In each case, one of the conditions exists which indicates that the operand 3 did not contain either of the different search arguments specified in operand 1. In this case, a "not found" indication is reported. This is done by setting the less than indicator (LT), which is bit 6 of the indicator register of the CIP as shown in FIG. 4. Further, in block 330, a test for the operand 2 type is also made. This test is performed on the data descriptor 2, bit 8, which is loaded into the analysis register 34 of the CIP as shown in FIG. 3. If analysis register, bit 8, is a binary one, indicating that the operand 2 is a packed operand, block 308 is entered, which indicates an illegal specification trap. However, if analysis register, bit 8, is a binary zero, indicating a string operand, as specified by DD2, the instruction has now been completed and a "not found" indication is reported by setting the LT indicator, and block 336 is entered indicating the end of the instruction.

The block 332 is entered from block 320 as a result of an equal indication of the comparison of a search argument of operand 1 and an entry of operand 3. This equal indication indicates that the item, which was searched for in operand 3, was found, and what remains to be determined is the offset of the starting location in operand 3 where this search argument was found. The operand 3 entry offset is determined by subtracting the remaining length of operand 3 (OL') from the original operand length (OL) of the operand 3. These two values are in the register file C locations EDT2 and EDT4 respectively. The contents in EDT4 are the original length of operand 3, which is the operand length OL, and was loaded therein during the sequence of block 316. The length OL', which is the contents of location EDT2, originally started out to be equal to OL, but was updated each time a pass through block 326 was made, and it contains the remaining length of the operand 3 which has not yet been searched. Thus, the difference of EDT4 and EDT2 gives the starting point or the displacement between the starting point of operand 3 and the point where the comparison was found to be equal. Further, a test in block 332 is made of the operand 2 type, which is done by testing the data descriptor 2 (DD2) by putting it into the analysis register 34. If analysis register bit 8 is a binary one, an illegal specification trap takes place and block 308 is entered, whereas, if analysis register bit 8 is a binary zero indicating that operand 2 is string data, block 334 is entered.

In block 334, an equal indication is posted by loading the LT indicator and the GT indicator with a zero, and the result of the search instruction (which is in counter 2 and which contains the operand 1 entry count which was found in operand 3 at a displacement of the difference of RFC EDT4 and RFC EDT2) is loaded into main memory in a location pointed to by the effective address 2 of operand 2. After completion of the write operation, block 336 is entered which indicates the end of execution of the search instruction.

The above explanation was basically for the search instruction and it has been shown that all of the four variations of the search instruction, that is, search string single, search string multiple, search array single and search array multiple, are all performed by the same set of firmware independent of the type of instructions. Further, the same firmware is also used to execute the verify instruction, including all of the four variations of the verify instruction. Since the firmware of the search and the verify instructions is shared between the two, an analogy can be made with respect to the execution for the verify instruction.

Figure 8:
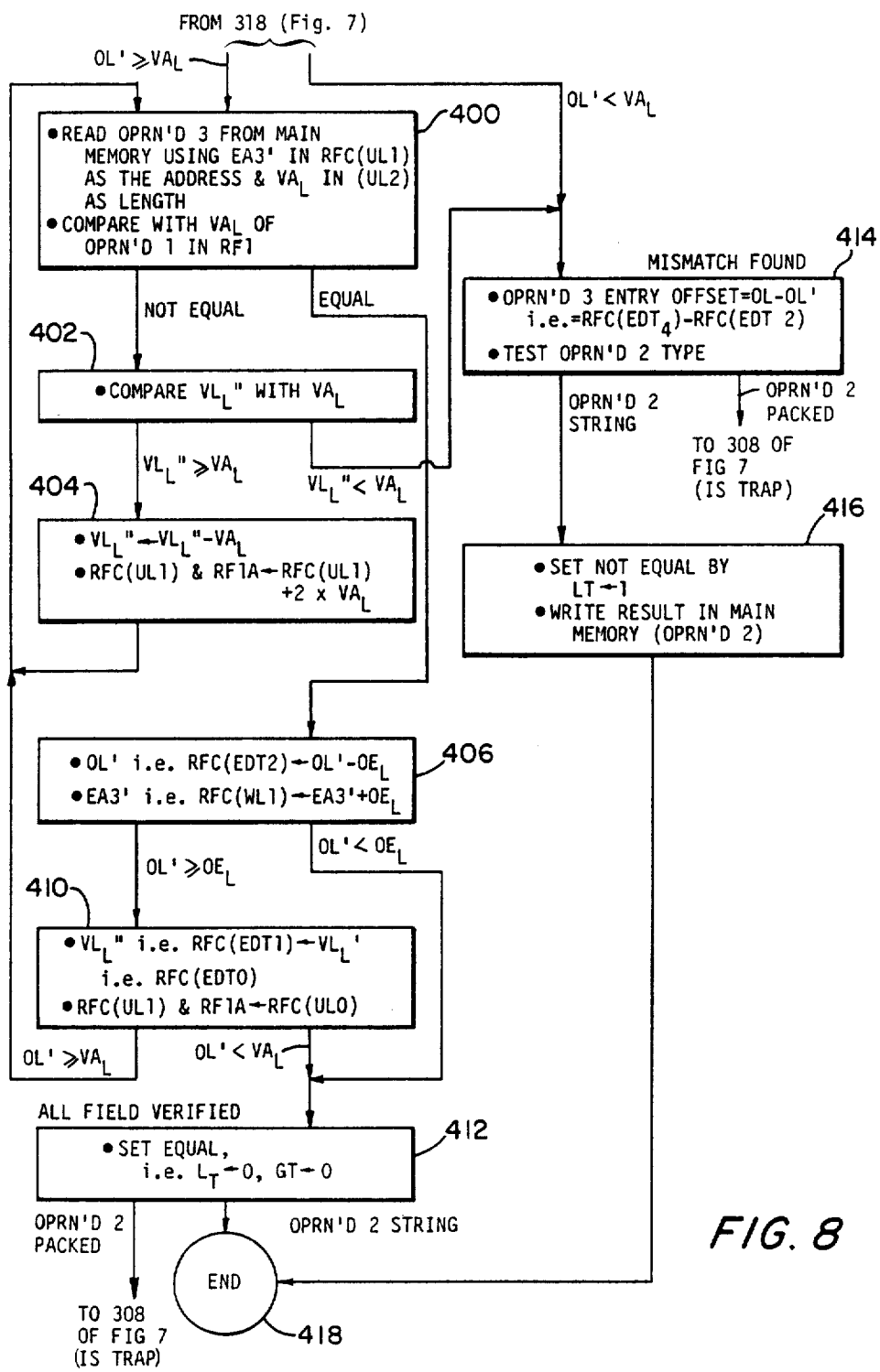
FIG. 8 is a detailed flow diagram illustrating the operation of the alphanumeric verify and verify apparatus and method of the present invention.

FIG. 8 shows part of the execution of the verify instruction. For the verify instruction, the flow up to block 318 of the search instruction is the same, except that $SA_L$ is replaced with $VA_L$, and SA' is replaced with $VA_L'$, and $SA_L''$ is replaced with $VA_L''$. At the output of block 318 of the search instruction, if the instruction was really a verify instruction, a comparison is made between OL' and the verify argument length $(VA_L)$. If OL' is greater than or equal to the verify argument length $(VA_L)$, block 400 (FIG. 8) is entered. This block 400 is similar to the block 320 of the search instruction, where operand 3 is read from main memory and compared with the verify argument of operand 1 in RF1. If OL' is found to be less than $VA_L$, then block 414 is entered, where a mismatch is to be reported. As a result of block 400, either block 402 or block 406 is entered depending upon whether the comparison was not equal or equal respectively. In block 402, which indicates that a not equal condition exists, a further comparison of $VL_L''$ is made with $VA_L$, that is, the remaining length of operand 1 in $VL_L''$ is compared with the verify argument length in $VA_L$. If $VL_L''$ is found to be less than $VA_L$, block 414 is entered, where again a mismatch condition is to be reported. Thus, when complete non-matching conditions are detected between one of the operand 3 elements and all of the verify indicia of operand 1, the comparison operation is 400-402-404 comparison loop and proceeds to END operation 418 via steps 414 and 418. However, if $VL_L''$ is found to be greater than or equal to $VA_L$, which indicates that there is more of the verify argument to be verified with this particular operand entry in operand 3, block 404 is entered. Block 404 is analogous to the block 324 of the search instruction where $VL_L''$ is updated by subtracting $VA_L$ from it.

Further, the most significant byte address of the verify argument in RF1 is updated by adding two times the verify argument length to the most significant byte address of the last verify argument, which is in UL1, and this new value of the most significant byte address is loaded into UL1 as well as in the RF1 pointer address in RF1A.

From block 404, an unconditional branch to block 400 is now made, whereby the next verify argument in operand 1 is going to be compared with this same operand entry of operand 3. The block 406 is entered from block 400 if an equal comparison is indicated. This particular operand element in operand 3 has been verified to be equal to one of the verify arguments in operand 1. The block 406 is analogous to the block 326 of the search instruction. Here the operand length, that is, the remaining operand 3 length in OL', is updated by subtracting the operand element length $OE_L$ from it, and this updated OL' is loaded into register file C location EDT2. Further, the address of this new operand element in operand 3 is updated in EA3', which is in RFC location UL1, by adding the prior contents of location UL1 to the operand element length ($OE_L$). In block 406, a test is also made to compare OL' with the operand element length. If OL' is greater than or equal to the operand element length ($OE_L$), thereby indicating that there are more entries in operand 3 to be verified, block 410 is entered. If the operand length OL' is less than the operand element length ($OE_L$), indicating that there are no more operand elements in the operand 3 to be verified, block 412 is entered.

In block 410, the most significant byte address of operand 1 is updated or is reinitialized to point to the first verify argument in operand 1, which is obtained from the register file C location UL0. This reinitialized value is loaded into RFC location UL1 and also into the register file 1, address register RF1A. In block 410, a comparison is also made on the remaining length of operand 3, i.e., OL', with the verify argument length $(VA_L)$. If the operand length OL' is less than the verify argument length $(VA_L)$, block 412 is entered, which indicates that the entire operand 3 has been verified to contain at least one or more of the verify arguments contained in operand 1. If OL' is greater than or equal to $VA_L$, which indicates that there are more elements in operand 3 which have to be verified with the elements of the operand 1 thereby indicating further verification, block 400 is entered.

Block 414 is entered from block 318 of FIG. 7 or block 402 of the verify instruction and indicates that a mismatch has been found. In this particular case, the result has to be loaded into the memory location addressed by effective address EA2 corresponding to the operand 2. Here, the LT indicator, which is the less-than indicator, is set to a binary one and the operand 3 offset, where the mismatch was found, is determined by the difference of OL and OL', as contained in RF locations EDT4 and EDT2 respectively. A test is also performed for the operand 2 type, indicating whether it is string or packed, packed creating an illegal specification trap and a string causing transfer to the operation of block 416 where a write operation into operand 2 in main memory is performed. After block 416, the instruction has completed and block 418 is again entered.

Block 412 is entered via block 410 or block 406. Entry to block 412 indicates that the entire operand 3 has been verified to contain one or more of the operands of operand 1. Here an equal indication is reported by loading a binary zero into the LT and the GT indicators of the CIP indicator register. Block 418 is entered, where this particular instruction has been completed and the CIP is now ready to execute the next instruction received from the CPU.

As has been seen, this search and verify capability provides improved performance since it provides the ability to perform four different variations of both the search and the verify instructions, these four different variations being search or verify single, search or verify multiple, both being strings, search or verify single array and search or verify multiple arrays. By providing this capability, the system has an added advantage since it does not have to perform a large number of instructions to execute such variations. The time required to perform such variations is reduced thereby providing improved response for the search and/or verify capability.

Having described the invention, what is claimed as new and novel and for which it is desired to secure Letters Patent is:

1. Apparatus in a data processing system for determining whether a first operand comprising a plurality of search indicia such as names, symbols, numbers, or the like match or are included as elements of a second operand to be searched comprising a list or array of indicia similar to the search indicia, the apparatus comprising:
   A. a first plurality of storage locations for storing the first operand including the plurality of search indicia;
   B. a second plurality of storage locations for storing the second operand including the plurality of elements to be searched;
   C. means for comparing each of said search indicia with one of said elements and for thereafter repeating said comparing operation with each other of said elements of said second operand to determine whether a match condition exists between one of said elements of said second operand and one of said search indicia of said first operand; and
   D. means, responsive to the detection of a match condition by said means for comparing, for generating an output identifying the search indicia of said first operand and the element of said second operand which produced said detected matched condition.

2. Apparatus as in claim 1 further including:
   A. means for enabling said means for comparing to compare each of said elements with said search indicia seriatim until each of said elements has been compared with each of said search indicia; and
   B. means for disabling said means for enabling when a match condition is detected between one of said elements and each one of said search indicia or when each of said elements has been compared to each of said search indicia.

3. Apparatus as in claim 2 further including means responsive to said output of said generating means for storing an indication of the storage location within said second plurality of storage locations storing said element of said operand producing said match condition.

4. Apparatus as in claim 3 wherein each of said search indicia comprises a plurality of characters and each of said elements comprises a plurality of characters equal in number to the number of characters in one of said search indicia and wherein said match condition denotes complete identity between the characters of one of said elements and the characters of one of said search indicia.

5. A machine implemented process performed by a data processing system for determining whether a first operand comprising a plurality of search indicia such as names, symbols, numbers, or the like, match or are included as elements of a second operand to be searched comprising a list or array of indicia similar to the search indicia, the method comprising the steps of:
   A. storing in a first plurality of storage locations the first operand including said plurality of search indicia;
   B. storing in a second plurality of storage locations the second operand including said plurality of elements to be searched;
   C. comparing each of said search indicia with one of said elements and repeating said comparing operation with the others of said elements to determine whether a match condition exists between one of said elements of said second operand and one of said search indicia of said first operand;
   D. disabling said step of comparing when a match condition is detected; and
   E. generating a result, in response to said step of disabling, indicating the identity of the element of the second operand and the search indicia of the first operand producing said match condition.

6. A process as in claim 5 wherein said elements are stored sequentially in string form.

7. A process as in claim 5 wherein said plurality of second storage locations are organized in a matrix format having a plurality of rows, each of said rows for storing a different one of said elements and wherein said method step for comparing said elements with said search indicia compares said rows of said elements individually and sequentially with said search indicia.

8. Apparatus in a data processing system for determining whether each of a plurality of verify indicia such as names, symbols, numbers, or the like comprising a first operand are included as elements of a second operand comprising a list or array of indicia similar to the verify indicia, the apparatus comprising:
   A. a first plurality of storage locations for storing the first operand including the plurality of verify indicia;
   B. a second plurality of storage locations for storing the second operand including the plurality of elements to be verified;
   C. means for comparing each of said verify indicia with each of said elements to determine whether a non-matching condition exists wherein any of said verify indicia is not included in said elements; and
   D. means, responsive to the detection by said means for comparing of a non-matching condition for generating an output identifying said particular verify indicia producing said non-matching condition.

9. Apparatus as in claim 8 further including:

A. means for enabling said means for comparing to compare each of said elements with each of said verify indicia seriatim; and B. means for disabling said means for enabling when a said non-matching condition is detected between one of said elements and all of said verify indicia.

10. Apparatus as in claim 9 wherein said means for generating said output generates an indication of the storage location of said first plurality of storage locations wherein said identified non-matching verify indicia is stored.

11. Apparatus as in claim 10 wherein each of said verify indicia comprises a plurality of characters and each of said elements comprises a plurality of characters equal in number to the number of characters in one of said verify indicia and wherein a non-matching condition is determined to exist in each case where the characters of one of said elements and the characters of one of said verify indicia are not identical.

12. A machine implemented process for performing a verify operation in a data processing system to determine whether a plurality of verify indicia such as names, symbols, numbers, or the like, comprising a first operand are included as elements of a second operand comprising a list or array of indicia similar to the verify indicia, the process comprising the steps of:

A. storing in a first plurality of storage locations the first operand including the plurality of verify indicia;

B. storing in a second plurality of storage locations the second operand including the plurality of elements to be verified;

C. comparing each of said verify indicia with each of said elements to determine whether a non-matching condition exists wherein one of said verify indicia is not included in said elements comprising said second operand;

D. disabling said step of comparing when a non-matching condition is detected between one of said verify indicia and all of said elements comprising said second operand; and E. generating an output in response to said step of disabling indicating the identity of said particular verify indicia producing said non-matching condition.

13. A process as in claim 12 wherein said second plurality of storage locations are arranged sequentially in string form.

14. A process as in claim 12 wherein said second plurality of storage locations storing said elements comprising said second operand is organized in a matrix format having a plurality of rows, each of said rows for storing one of said elements and wherein, during said step of comparing, said rows of said second plurality of storage locations are compared sequentially with said verify indicia.

* * * * *